(No Model.)
J. W. STRINGFELLOW.
NUT LOCK.
No. 256,760. Patented Apr. 18, 1882.
Fig. 1,
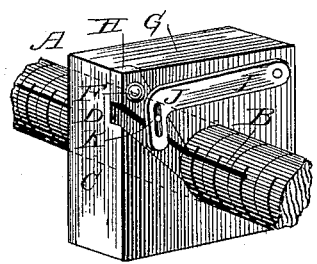
Fig. 2,     Fig. 3,
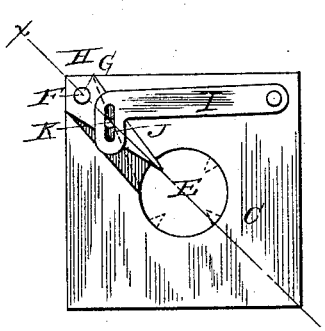 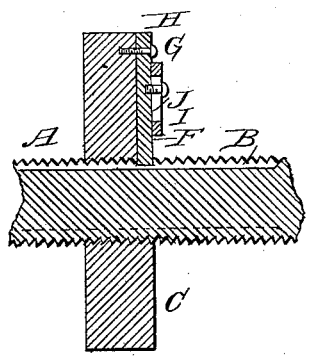
WITNESSES:
Fred. G. Dieterich
Charles H. Bates
INVENTOR.
J. W. Stringfellow
by C. A. Snow & Co.
ATTORNEYS.

UNITED STATES PATENT OFFICE.

JOHN W. STRINGFELLOW, OF NEW HAVEN, INDIANA.

NUT-LOCK.

SPECIFICATION forming part of Letters Patent No. 256,760, dated April 18, 1882.

Application filed February 11, 1882. (No model.)

*To all whom it may concern:*

Be it known that I, JOHN W. STRINGFELLOW, of New Haven, in the county of Allen and State of Indiana, have invented certain new and useful Improvements in Nut-Locks; and I do hereby declare that the following is a full, clear, and exact description of the invention, which will enable others skilled in the art to which it appertains to make and use the same, reference being had to the accompanying drawings, which form a part of this specification.

Figure 1 is a perspective view. Fig. 2 is a plan view of the nut, detached; and Fig. 3 is a section on the line $x\ x$, Fig. 2.

Corresponding parts in the several figures are denoted by like letters of reference.

This invention relates to nut-locks; and it consists in certain improvements in the construction of the same, which will be hereinafter fully described, and particularly pointed out in the claims.

In the drawings hereto annexed, A represents the bolt, which is provided along its threaded portion with one or more—say four—longitudinal grooves, B B.

C is the nut, which is provided upon its inner side with a shallow recess, D, extending from the central eye or opening, E, to one of the corners of the nut. In the recess D is pivoted a latch or pawl, F, the fulcrum-pin of which G is near the corner of the nut. The inner end or point, H, of the latch F extends slightly over the eye or opening E, so as to be capable of engaging the longitudinal grooves B in the bolt. Its outer end is squared off, as shown, so as to fit the corner of the nut.

I is a flat metallic lever, which may be made of ordinary sheet metal. Said lever is pivoted to the corner of the nut adjoining the corner at which the latch F is pivoted. The lever I is provided at its outer end with a slot, J, fitting upon a small stud, K, upon the face of latch F, said stud being located at some point between the fulcrum and the free end of said latch.

The operation and advantages of my invention will be readily understood. When the latch F is swung back, so as not to engage the grooves B in the bolt, it is held in such position by the lever I, which by the slot J adjusts itself upon the stud K of the latch. Thus, when the nut is being adjusted upon the bolt and has been sufficiently tightened, a slight reverse movement of the nut will cause the latch F to engage one of the grooves B, thus locking the nut in position. When it is desired to remove the nut, it is first slightly tightened upon the bolt, in order to disengage the latch F from groove B. The latch may then, by striking its projecting square end a light blow with a hammer, be further thrown back, so as to be safely held by the lever I, after which the nut may be readily removed.

It will be seen that while by my invention the nut may be locked securely upon the bolt it may, whenever desired, be easily removed without injury to either the nut or bolt.

Having thus described my invention, I claim and desire to secure by Letters Patent of the United States—

1. The combination of the nut C, having recess D, the latch F, pivoted in said recess and having stud K, and the lever I, pivoted upon said nut and having slot J, fitting over the stud K upon the latch F, as set forth.

2. As an improvement in nut-locks, the combination, with the bolt A, having longitudinal grooves B, of the nut C, having recess D, latch F, pivoted in said recess, and having stud K, and the lever I, having slot J, all arranged and operating substantially as and for the purpose set forth.

In testimony that I claim the foregoing as my own I have hereto affixed my signature in presence of two witnesses.

JOHN W. STRINGFELLOW.

Witnesses:
  JAMES M. YERKS,
  JOHN H. BYERS.